United States Patent
Lou et al.

(10) Patent No.: US 9,172,967 B2
(45) Date of Patent: *Oct. 27, 2015

(54) CODING AND DECODING UTILIZING ADAPTIVE CONTEXT MODEL SELECTION WITH ZIGZAG SCAN

(75) Inventors: Jian Lou, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 13/253,385

(22) Filed: Oct. 5, 2011

(65) Prior Publication Data

US 2012/0082234 A1     Apr. 5, 2012

Related U.S. Application Data

(60) Provisional application No. 61/389,932, filed on Oct. 5, 2010.

(51) Int. Cl.
  *H04N 7/12*     (2006.01)
  *H04N 19/18*    (2014.01)
      (Continued)

(52) U.S. Cl.
  CPC .............. *H04N 19/18* (2014.11); *H04N 19/13* (2014.11); *H04N 19/134* (2014.11); *H04N 19/136* (2014.11); *H04N 19/196* (2014.11); *H04N 19/463* (2014.11); *H04N 19/61* (2014.11)

(58) Field of Classification Search
  CPC ... H04N 19/196; H04N 19/13; H04N 19/134; H04N 19/18; H04N 19/463; H04N 19/136; H04N 19/61
  USPC .......................................... 375/240.18, 240.2
  See application file for complete search history.

(56) References Cited

U.S. PATENT DOCUMENTS 4,710,810 A    12/1987   Koga
5,150,209 A     9/1992   Baker et al.
(Continued)

FOREIGN PATENT DOCUMENTS

EP    1351510    10/2003
EP    1768415     3/2007
(Continued)

OTHER PUBLICATIONS

Tu et al. "Context-Based Entropy Coding of Block Transform Coefficients for Image Compression". IEEE Transactions on Image Processing, vol. 11, No. 11, Nov. 2002, pp. 1271-1283.*
(Continued)

*Primary Examiner* — Christopher S Kelley
*Assistant Examiner* — Zhihan Zhou
(74) *Attorney, Agent, or Firm* — Young Basile Hanlon & MacFarlane P.C.

(57) ABSTRACT

There is a coding. The coding may include preparing video compression data based on source pictures utilizing a processor. The preparing may include processing a generated transform unit, including generating a significance map having a significance map array with y-x locations corresponding to the transform array. The generating may include scanning, utilizing a zigzag scanning pattern, a plurality of significance map elements in the significance map array. The generating may also include determining, utilizing the zigzag scanning pattern, a context model for coding a significance map element of the plurality of significance map elements based on a value associated with at least one coded neighbor significance map element of the significance map element in the significance map array. There is also a decoding including processing video compression data which is generated in the coding.

20 Claims, 9 Drawing Sheets

(51) Int. Cl.
*H04N 19/196* (2014.01)
*H04N 19/13* (2014.01)
*H04N 19/134* (2014.01)
*H04N 19/61* (2014.01)
*H04N 19/463* (2014.01)
*H04N 19/136* (2014.01)

(56) References Cited

U.S. PATENT DOCUMENTS

| | | |
|---|---|---|
| 5,260,783 A | 11/1993 | Dixit |
| 5,461,423 A | 10/1995 | Tsukagoshi |
| 5,650,782 A | 7/1997 | Kim |
| 5,686,962 A | 11/1997 | Chung et al. |
| 5,708,473 A | 1/1998 | Mead |
| 5,767,909 A | 6/1998 | Jung |
| 5,777,680 A | 7/1998 | Kim |
| 5,818,536 A | 10/1998 | Morris et al. |
| 5,886,652 A | 3/1999 | Adachi et al. |
| 6,125,144 A | 9/2000 | Matsumura et al. |
| 6,157,326 A | 12/2000 | Van Der Vleuten et al. |
| 6,212,234 B1 | 4/2001 | Andoh et al. |
| 6,314,208 B1 | 11/2001 | Konstantinides et al. |
| 6,414,995 B2 | 7/2002 | Okumura et al. |
| 6,418,166 B1 | 7/2002 | Wu et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,570,924 B1 | 5/2003 | Lynch et al. |
| 6,661,925 B1 | 12/2003 | Pianykh et al. |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,116,831 B2 | 10/2006 | Mukerjee et al. |
| 7,226,150 B2 | 6/2007 | Yoshimura et al. |
| 7,432,329 B2 | 10/2008 | Haubennestel et al. |
| 7,496,143 B2 | 2/2009 | Schwarz et al. |
| 7,843,998 B2 | 11/2010 | Bjontegaard |
| 8,064,527 B2 | 11/2011 | Liu et al. |
| 8,116,373 B2 | 2/2012 | Base et al. |
| 8,200,033 B2 | 6/2012 | Mietens et al. |
| 8,254,700 B1 | 8/2012 | Rastogi |
| 8,265,162 B2 | 9/2012 | Tian et al. |
| 8,270,738 B2 | 9/2012 | Raveendran et al. |
| 8,311,119 B2 | 11/2012 | Srinivasan |
| 8,331,444 B2 | 12/2012 | Karczewicz et al. |
| 8,344,917 B2 | 1/2013 | Misra et al. |
| 8,374,445 B2 | 2/2013 | Benndorf |
| 8,401,083 B2 | 3/2013 | Crotty et al. |
| 8,938,001 B1 | 1/2015 | Bankoski et al. |
| 2001/0022815 A1 | 9/2001 | Agarwal |
| 2002/0009153 A1 | 1/2002 | Jeon et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2003/0081850 A1 | 5/2003 | Karczewicz et al. |
| 2003/0215018 A1 | 11/2003 | MacInnis et al. |
| 2003/0227972 A1 | 12/2003 | Fukuda |
| 2004/0013194 A1* | 1/2004 | Piche et al. ............ 375/240.2 |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0151252 A1 | 8/2004 | Sekiguchi et al. |
| 2004/0234144 A1 | 11/2004 | Sugimoto et al. |
| 2005/0123207 A1* | 6/2005 | Marpe et al. ............ 382/239 |
| 2005/0201470 A1 | 9/2005 | Sievers |
| 2005/0276323 A1 | 12/2005 | Martemyanov et al. |
| 2006/0078049 A1* | 4/2006 | Bao et al. ............ 375/240.11 |
| 2006/0126724 A1 | 6/2006 | Cote et al. |
| 2006/0203916 A1 | 9/2006 | Chandramouly et al. |
| 2007/0025441 A1 | 2/2007 | Ugur et al. |
| 2007/0127831 A1 | 6/2007 | Venkataraman |
| 2007/0136742 A1 | 6/2007 | Sparrell |
| 2007/0160133 A1* | 7/2007 | Bao et al. ............ 375/240.1 |
| 2007/0177673 A1 | 8/2007 | Yang |
| 2008/0170615 A1 | 7/2008 | Sekiguchi et al. |
| 2008/0181299 A1 | 7/2008 | Tian et al. |
| 2008/0310503 A1 | 12/2008 | Lee et al. |
| 2008/0310745 A1 | 12/2008 | Ye et al. |
| 2009/0175332 A1 | 7/2009 | Karczewicz et al. |
| 2009/0190659 A1 | 7/2009 | Lee et al. |
| 2010/0054328 A1 | 3/2010 | Nozawa |
| 2010/0097250 A1 | 4/2010 | Demircin et al. |
| 2010/0098169 A1 | 4/2010 | Budagavi |
| 2010/0290568 A1 | 11/2010 | Suzuki et al. |
| 2011/0080946 A1 | 4/2011 | Li et al. |
| 2012/0082220 A1 | 4/2012 | Mazurenko et al. |
| 2012/0147948 A1 | 6/2012 | Sole et al. |
| 2012/0183052 A1 | 7/2012 | Lou et al. |
| 2012/0207222 A1 | 8/2012 | Lou et al. |
| 2012/0320978 A1 | 12/2012 | Ameres et al. |

FOREIGN PATENT DOCUMENTS

| | | |
|---|---|---|
| JP | 2217088 | 8/1990 |
| JP | 2272970 | 11/1990 |
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| KR | 100213018 | 8/1999 |
| KR | 200130916 | 4/2001 |
| WO | WO0150770 | 7/2001 |
| WO | 02/35854 A1 | 5/2002 |
| WO | WO03026315 | 3/2003 |
| WO | 2008/108534 A1 | 9/2008 |

OTHER PUBLICATIONS

PCT Search Report & Written Opinion, Re: Application #PCT/US2011/054999; Dec. 5, 2011.
Chengjie Tu, et al, "Context-Based Entropy Coding of Block Transform Coefficients for Image Compression", IEEE Transactions on Image Processing, vol. 11, No. 11, Nov. 1, 2002.
Sze V, et al, "Parallelization of HHI_TRANSFORM_CODING"..3 JCT-VC Meeting, '94 MPEG Meeting of Oct. 7-Oct. 15, 2010.
Winken (Fraunhofer HHI) M, et al, "Video Coding Technology Proposal by Fraunhofer HHI", 1. JCT-VC Meeting Apr. 15-Apr. 23, 2010.
Marpe D, et al, "Context-Based Adaptive Binary Arithmetic Coding in the H.264/AVC Video Compression Standard", IEEE Transactions on Circuits and Systems for Video Technology, vol. 13, No. 7, Jul. 1, 2003.
Vadim Seregin, et al, "Low-Complexity Adaptive Coefficients Scanning", Joint Collaborative Team on Video Coding (JCT-VC) of ITU-T, vol. JCTCV-C205, Oct. 2, 2010.
Lou J, et al, "On Context Selection for Significant_Coeff_Flag Coding", 96. MPEG Meeting, Mar. 21-Mar. 25, 2011.
Jian Lou, et al, "Parallel Processing Friendly Context Modeling for Significance Map Coding in CABAC", 95. MPEG Meeting, Jan. 24-Jan. 28, 2011.
Min J, et al, "Adaptive Significance Map Coding for Large Transform", 6. JCT-VC Meeting; 97. MPEG Meeting Jul. 14-Jul. 22, 2011.
Tung Nguyen, et al, "Improved Context Modeling for Coding Quantized Transform Coefficients in Video Compression", Picture Coding Symposium 2010; Dec. 8-Dec. 10, 2010.
Lou J, et al, "Zigzag Scan for CABAC/PIPE", 94. MPEG Meeting, Oct. 11-Oct. 15, 2010.
Sullivan, G.J. et al., "Recent developments in standardization of high efficiency video coding (HEVC)", Society of Photo-Optical Instrumentation Engineers, 2010.
Ferreira, R.U. et al., "Efficiency Improvements for a Geometric-Partition-Based Video Coder", ICIP 2009: 16th IEEE International Conference on Image Processing, Nov. 2009.
Kim, Munchurl, "Tool Experiment 9: Large Block Structure", Joint Collaborative Team on Video Coding (JCT-VC) of ITU-T SG16 WP3 and ISO/IEC JTC1/SC29/WG11, Jul. 2010.

(56) References Cited

OTHER PUBLICATIONS

Said, Amir, "Introduction to Arithmetic Coding—Theory and Practice", HP Laboratories Palo Alto, HPL-2004-76, Apr. 2004.
Sugimoto, Kazuo et al., "Proposal on Improved Entropy Coding Method for DCT coefficients", Joint Collaborative Team on Video Coding (JCT-VC) of ITU-T SG16 WP3 and ISO/IEC JTC1/SC29/WG11, Jul. 2010.
Davies, Thomas et al., "Suggestion for a Test Model", Joint Collaborative Team on Video Coding (JCT-VC) of ITU-T SG16 WP3 and ISO/IEC JTC1/SC29/WG11, Apr. 2010.
Canadian Office Action in CA2810899, related to U.S. Appl. No. 13/253,385, mailed Jan. 25, 2015.
Chenjie Tu et al., "Context-Based Entropy of Block Transform Coefficients for Image Compression" IEEE 11, No. 11, Nov. 1, 2002, pp. 1271-1283.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
ISR & Written Opinion in Application # PCT/US2012/024608; mailed Jun. 5, 2012.
ISR and Written Opinion of the International Searching Authority, for Int'l Application No. PCT/US2012/020707; Feb. 15, 2012, 15 pages.
Overview; VP7 Data Format and Decoder. Version 1.5. On2 Technologies, Inc. Dated Mar. 28, 2005.
Park, Jun Sung, et al., "Selective Intra Prediction Mode Decision for H.264/AVC Encoders", World Academy of Science, Engineering and Technology 13, (2006).
Richardson, "H.264/MPEG-4 Part 10: Introduction to CABAC," Oct. 17, 2002.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
Wiegand, et al., Overview of th H.264/AVC Video Coding Standard, IEEE Transactions on Circuits and Systems for Video Technology, p. 1-19, Jul. 2003.
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.
Winken (Fraunhofer HHI) M. et al., "Description of Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. 24 Apr. 2010, all pages.

\* cited by examiner

2x2 Fixed Model
400

| 0 | 1 |
|---|---|
| 2 | / |

FIG. 4A

4x4 Fixed Model
410

| 0 | 1 | 5 | 6 |
|---|---|---|---|
| 2 | 4 | 7 | 12 |
| 3 | 8 | 11 | 13 |
| 9 | 10 | 14 | / |

FIG. 4B

8x8 Fixed Model
420

| 0 | 1 | 5 | 5 | 5 | 5 | 9 | 10 |
|---|---|---|---|---|---|---|---|
| 2 | 4 | 4 | 4 | 4 | 8 | 9 | 14 |
| 3 | 4 | 4 | 4 | 7 | 8 | 9 | 10 |
| 3 | 4 | 4 | 7 | 7 | 8 | 9 | 14 |
| 3 | 4 | 7 | 7 | 7 | 8 | 9 | 10 |
| 3 | 6 | 6 | 6 | 6 | 6 | 9 | 14 |
| 3 | 11 | 11 | 11 | 11 | 11 | 11 | 10 |
| 12 | 13 | 12 | 13 | 12 | 13 | 12 | / |

CODING AND DECODING UTILIZING ADAPTIVE CONTEXT MODEL SELECTION WITH ZIGZAG SCAN

PRIORITY

The present application claims the benefit of priority to U.S. Provisional Patent Application Ser. No. 61/389,932, filed on Oct. 5, 2010, entitled "Adaptive Context Selection for Zigzag Scan", by Jian Lou, et al., the disclosure of which is hereby incorporated by reference in its entirety.

CROSS REFERENCE TO RELATED APPLICATIONS

The present application is related to U.S. Utility patent application Ser. No. 13/253,933, filed on Oct. 5, 2011, entitled "Coding and Decoding Utilizing Context Model Selection with Adaptive Scan Pattern", by Jian Lou, et al., which claims priority to U.S. Provisional Patent Application Ser. No. 61/393,198, filed on Oct. 14, 2010, entitled "Context Selection for Adaptive Scanning Pattern", by Jian Lou, et al., the disclosures of which are hereby incorporated by reference in their entirety.

BACKGROUND

Video compression utilizes block processing for many operations. In block processing, a block of neighboring pixels is grouped into a coding unit and compression operations treat this group of pixels as one unit to take advantage of correlations among neighboring pixels within the coding unit. Block-based processing often includes prediction coding and transform coding. Transform coding with quantization is a type of data compression which is commonly "lossy" as the quantization of a transform block taken from a source picture often discards data associated with the transform block in the source picture, thereby lowering its bandwidth requirement but often also resulting in lower quality reproduction of the original transform block from the source picture.

MPEG-4 AVC, also known as H.264, is an established video compression standard utilizing transform coding in block processing. In H.264, a picture is divided into macroblocks (MBs) of 16×16 pixels. Each MB is often further divided into smaller blocks. Blocks equal in size to or smaller than a MB are predicted using intra-/inter-picture prediction, and a spatial transform along with quantization is applied to the prediction residuals. The quantized transform coefficients of the residuals are commonly encoded using entropy coding methods (i.e., variable length coding or arithmetic coding). Context Adaptive Binary Arithmetic Coding (CABAC) was introduced in H.264 to provide a substantially lossless compression efficiency by combining an adaptive binary arithmetic coding technique with a set of context models. Context model selection plays a role in CABAC in providing a degree of adaptation and redundancy reduction. H.264 specifies two kinds of scan patterns over 2D blocks. A zigzag scan is utilized for pictures coded with progressive video compression techniques and an alternative scan is for pictures coded with interlaced video compression techniques.

H.264 uses 2D block-based transform of block sizes 2×2, 4×4 and 8×8. A block-based transform converts a block of pixels in spatial domain into a block of coefficients in transform domain. Quantization then maps transform coefficients into a finite set. After quantization, many high frequency coefficients become zero. For a block having at least one non-zero coefficient after 2D transform and quantization operation, a significance map is developed, which specifies the position(s) of the non-zero quantized coefficient(s) within the 2D transform domain. Specifically, given a quantized 2D transformed block, if the value of a quantized coefficient at a position (y, x) is non zero, it is considered as significant and a "1" is assigned for the position (y, x) in the associated significance map. Otherwise, a "0" is assigned to the position (y, x) in the significance map. In H.264, CABAC is used for coding and decoding each element of the significance map.

HEVC (High Efficiency Video Coding), an international video coding standard being developed to succeed H.264, extends transform block sizes to 16×16 and 32'32 pixels to benefit high definition (HD) video coding. In the models under consideration for HEVC, a set of transform coefficient coding and decoding tools can be enabled for entropy coding and decoding. Among these tools is an adaptive scan scheme, which is applied for significance map coding and decoding. This scheme adaptively switches between two scan patterns for coding and decoding a significance map if the significance map array size is larger than 8×8.

The adaptive scan scheme directs the scan order for coding and decoding a significance map by switching between two predefined scan patterns per diagonal line, either from bottom-left to top-right or from top-right to bottom-left diagonally. The switching occurs at the end of each diagonal sub-scan, and is controlled by two counters. The first counter, $c_1$, tracks the number of coded significant transform coefficients located in the bottom-left half of a transform block. The second counter, $c_2$, tracks the number of coded significant transform coefficients which are located in the top-right half of a transform block. The implementation of the models considered for HEVC with using two scan patterns and two counters introduces substantial computational complexity and additional memory requirements. These complexities include tracking the count of coded significant transform coefficients located in the bottom-left half or in the top-right half of a transform, performing branch operations and making scan selections for coefficients in significance map coding and decoding. On the other hand, the adaptive scan scheme achieves only a negligible performance gain. Or, it provides no substantial gain in reducing bandwidth requirements for compression data associated with transform processing.

SUMMARY

According to principles of the invention, there are systems, methods, and computer readable mediums (CRMs) which provide for coding and decoding utilizing adaptive context model selection with zigzag scan. By utilizing adaptive context model selection by zigzag scan, inefficiencies in transform processing are reduced. These include inefficiencies based on overhead associated with computational complexities including tracking the counts of coded significant transform coefficients located in the bottom-left half and in the top-right half of a transform, performing branch operations and making scan selections for coefficients in significance map coding and decoding.

According to a first principle of the invention, there is a system for coding. The system may include a processor configured to prepare video compression data based on source pictures. The preparing may include partitioning the source pictures into coding units. The preparing may also include generating one or more transform unit(s) having a transform array. The transform array may including transform coefficients assigned as entries to y-x locations of the transform array. The transform coefficients may be based on residual measures associated with the coding units. The preparing may include processing the generated transform unit. The processing may include generating a significance map, having a significance map array with y-x locations corresponding to the y-x locations of the transform array. The processing may also include scanning, utilizing a zigzag scanning pattern, a plurality of significance map elements in the significance map array. The processing may also include determining, utilizing the zigzag scanning pattern, a context model for coding a significance map element of the plurality of significance map elements based on a value associated with at least one coded neighbor significance map element of the significance map element in the significance map array.

According to a second principle of the invention, there is a method for coding. The method may include preparing video compression data based on source pictures. The preparing may include partitioning the source pictures into coding units. The preparing may also include generating one or more transform unit(s) having a transform array. The transform array may including transform coefficients assigned as entries to y-x locations of the transform array. The transform coefficients may be based on residual measures associated with the coding units. The preparing may include processing the generated transform unit. The processing may include generating a significance map, having a significance map array with y-x locations corresponding to the y-x locations of the transform array. The processing may also include scanning, utilizing a zigzag scanning pattern, a plurality of significance map elements in the significance map array. The processing may also include determining, utilizing the zigzag scanning pattern, a context model for coding a significance map element of the plurality of significance map elements based on a value associated with at least one coded neighbor significance map element of the significance map element in the significance map array.

According to a third principle of the invention, there is a non-transitory CRM storing computer readable instructions which, when executed by a computer system, performs a method for coding. The method may include preparing video compression data based on source pictures. The preparing may include partitioning the source pictures into coding units. The preparing may also include generating one or more transform unit(s) having a transform array. The transform array may include transform coefficients assigned as entries to y-x locations of the transform array. The transform coefficients may be based on residual measures associated with the coding units. The preparing may include processing the generated transform unit. The processing may include generating a significance map, having a significance map array with y-x locations corresponding to the y-x locations of the transform array. The processing may also include scanning, utilizing a zigzag scanning pattern, a plurality of significance map elements in the significance map array. The processing may also include determining, utilizing the zigzag scanning pattern, a context model for coding a significance map element of the plurality of significance map elements based on a value associated with at least one coded neighbor significance map element of the significance map element in the significance map array.

According to a fourth principle of the invention, there is a system for decoding. The system may include an interface configured to receive video compression data. The system may also include a processor configured to process the received video compression data. The received video compression data may be based on processed transform units, based on source pictures. The preparing may include partitioning the source pictures into coding units. The preparing may also include generating one or more transform unit(s) having a transform array. The transform array may include transform coefficients assigned as entries to y-x locations of the transform array. The transform coefficients may be based on residual measures associated with the coding units. The preparing may include processing the generated transform unit. The processing may include generating a significance map, having a significance map array with y-x locations corresponding to the y-x locations of the transform array. The processing may also include scanning, utilizing a zigzag scanning pattern, a plurality of significance map elements in the significance map array. The processing may also include determining, utilizing the zigzag scanning pattern, a context model for coding a significance map element of the plurality of significance map elements based on a value associated with at least one coded neighbor significance map element of the significance map element in the significance map array.

According to a fifth principle of the invention, there is a method for decoding. The method may include receiving video compression data. The method may also include processing the received video compression data. The received video compression data may be based on processed transform units, based on source pictures. The preparing may include partitioning the source pictures into coding units. The preparing may also include generating one or more transform unit(s) having a transform array. The transform array may include transform coefficients assigned as entries to y-x locations of the transform array.

The transform coefficients may be based on residual measures associated with the coding units. The preparing may include processing the generated transform unit. The processing may include generating a significance map, having a significance map array with y-x locations corresponding to the y-x locations of the transform array. The processing may also include scanning, utilizing a zigzag scanning pattern, a plurality of significance map elements in the significance map array. The processing may also include determining, utilizing the zigzag scanning pattern, a context model for coding a significance map element of the plurality of significance map elements based on a value associated with at least one coded neighbor significance map element of the significance map element in the significance map array.

According to a sixth principle of the invention, there is a CRM storing computer readable instructions which, when executed by a computer system, performs a method for decoding. The method may include processing the received video compression data. The received video compression data may be based on processed transform units, based on source pictures. The preparing may include partitioning the source pictures into coding units. The preparing may also include generating one or more transform unit(s) having a transform array. The transform array may include transform coefficients assigned as entries to y-x locations of the transform array. The transform coefficients may be based on residual measures associated with the coding units. The preparing may include processing the generated transform unit. The processing may include generating a significance map, having a significance map array with y-x locations corresponding to the y-x locations of the transform array. The processing may also include scanning, utilizing a zigzag scanning pattern, a plurality of significance map elements in the significance map array. The processing may also include determining, utilizing the zigzag scanning pattern, a context model for coding a significance map element of the plurality of significance map elements based on a value associated with at least one coded neighbor significance map element of the significance map element in the significance map array.

These and other objects are accomplished in accordance with the principles of the invention in providing systems, methods and CRMs which code and decode utilizing adaptive context model selection with zigzag scan. Further features, their nature and various advantages will be more apparent from the accompanying drawings and the following detailed description of the preferred embodiments.

BRIEF DESCRIPTION OF THE DRAWINGS

Features of the examples and disclosure are apparent to those skilled in the art from the following description with reference to the figures, in which:

FIG. 4A is a model illustrating fixed model selection in significance map coding and decoding of a 2×2 array, according to an example;

FIG. 4B is a model illustrating fixed model selection in significance map coding and decoding of a 4×4 array, according to an example;

FIG. 4C is a model illustrating fixed model selection in significance map coding and decoding of an 8×8 array, according to an example;

DETAILED DESCRIPTION

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some methods and structures have not been described in detail so as not to unnecessarily obscure the description. Furthermore, different embodiments are described below. The embodiments may be used or performed together in different combinations.

As used herein, the term "includes" means "includes at least" but is not limited to the term "including only". The term "based on" means "based at least in part on". The term "picture" means a picture which is either equivalent to a frame or equivalent to a field associated with a frame, such as a field which is one of two sets of interlaced lines of an interlaced video frame. The term "bitstream" is a digital data stream. The term "coding" may refer to encoding of an uncompressed video sequence. The term "coding" may also refer to the transcoding of a compressed video bitstream from one compressed format to another. The term "decoding" may refer to the decoding of a compressed video bitstream.

Figure 1:
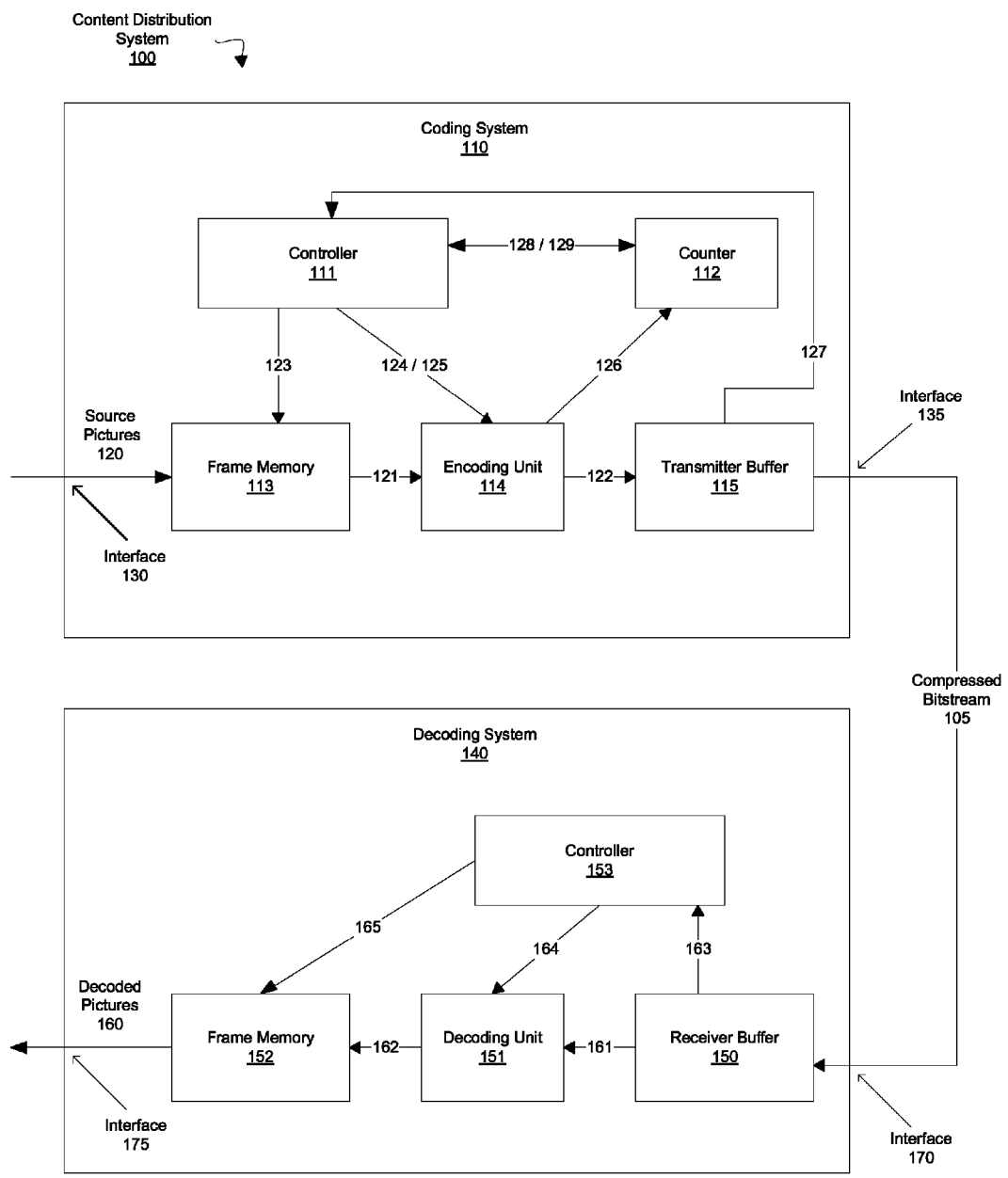
FIG. 1 is a block diagram illustrating a coding system and a decoding system utilizing adaptive context model selection by zigzag scan, according to an example.

As demonstrated in the following examples and embodiments, there are systems, methods, and machine readable instructions stored on computer-readable media (e.g., CRMs) for coding and decoding utilizing adaptive context model selection with zigzag scan. Referring to FIG. 1, there is disclosed a content distribution system 100 including a coding system 110 and a decoding system 140 utilizing adaptive context model selection with zigzag scan.

In the coding system 110, the adaptive context model selection with zigzag scan is associated with preparing video compression data based on source pictures by partitioning the source pictures into coding units, and processing transform units based on the coding units.

In the decoding system 140, the adaptive context model selection with zigzag scan is associated with decoding received video compression information which is prepared utilizing adaptive context model selection with zigzag scan based on preparing video compression data based on source pictures by partitioning the source pictures into coding blocks, and processing transform units based on the coding units.

Coding for transform units may include three aspects: (1) significance map coding, (2) non-zero coefficient level coding, and (3) non-zero coefficient sign coding. Transform units may be processed in generating video compression data, according to an example, by generating a transform unit having a transform array including transform coefficients assigned as entries to y-x locations of the transform array, based on residual measures associated with the coding units. The processing of the generated transform unit may include generating a significance map having a significance map array with y-x locations corresponding to the y-x locations of the transform array. Generating the significance map may include checking of transform coefficients within the generated transform unit. The coding of significance map may include scanning, utilizing a zigzag scanning pattern, a plurality of significance map elements in the significance map array. The generating may also include determining a context model for coding a significance map element. The coding system 110 and a decoding system 140 are described in greater detail below after the following detailed description of adaptive context model selection with zigzag scan.

Figure 2A:
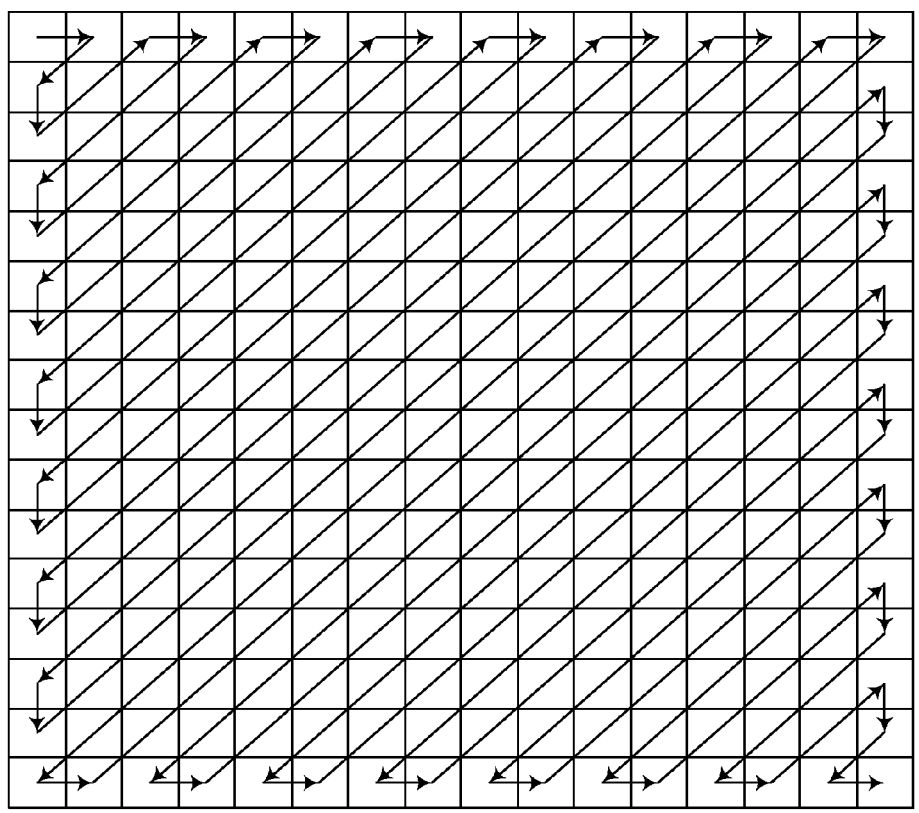
FIG. 2A is a scan pattern illustrating a zigzag scan for significance map coding and decoding, according to an example.
Figure 2B:
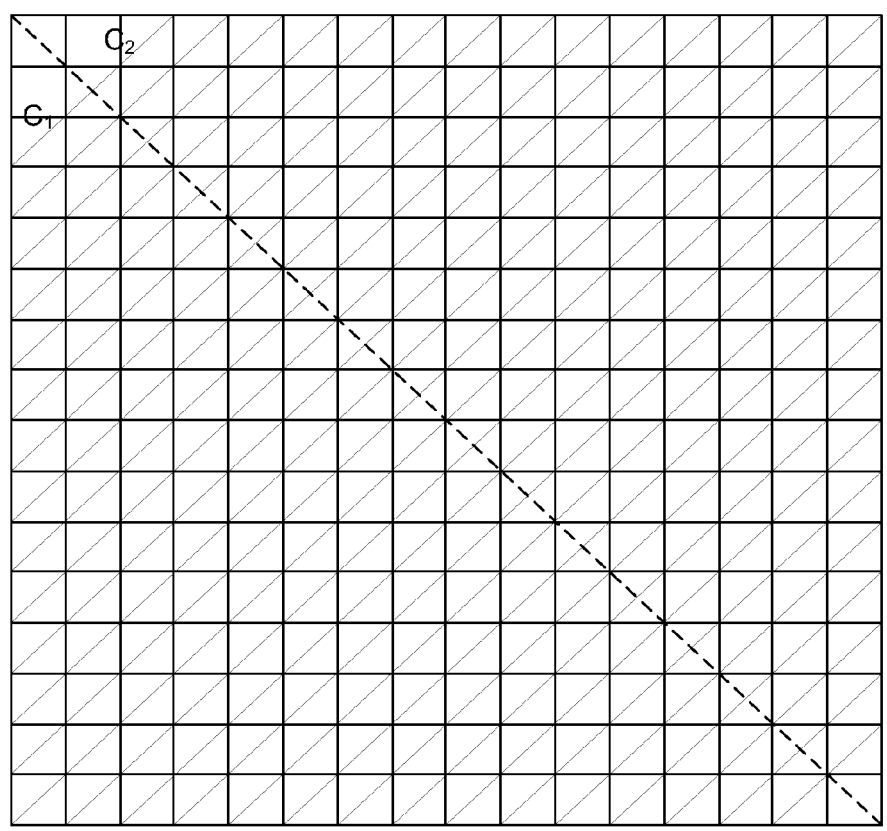
FIG. 2B is a scan pattern illustrating for comparison purposes an adaptive split zigzag scan for significance map coding and decoding, according to a comparative example.

FIG. 2A is an example of a zigzag scan 200 used for the significance map coding and decoding for transform units (i.e., a transform unit having a transform array for adaptive context model selection). As an example, FIG. 2A shows the zigzag scan for 16×16 blocks. The zigzag scan is utilized with adaptive context model selection to determine the sequence by which transform elements, such as transform coefficients, are processed. According to an example, the determination of the context model may be done utilizing the zigzag scanning pattern 200. The context model may be selected based on one or more value(s) associated with at least one coded neighbor significance map element of the significance map element in the significance map array. By comparison, in the models under consideration for HEVC, an adaptive split zigzag scan is used. FIG. 2B is a comparative example of an adaptive split zigzag scan 250 and will be discussed in greater detail in the comparative example below.

Figure 3:
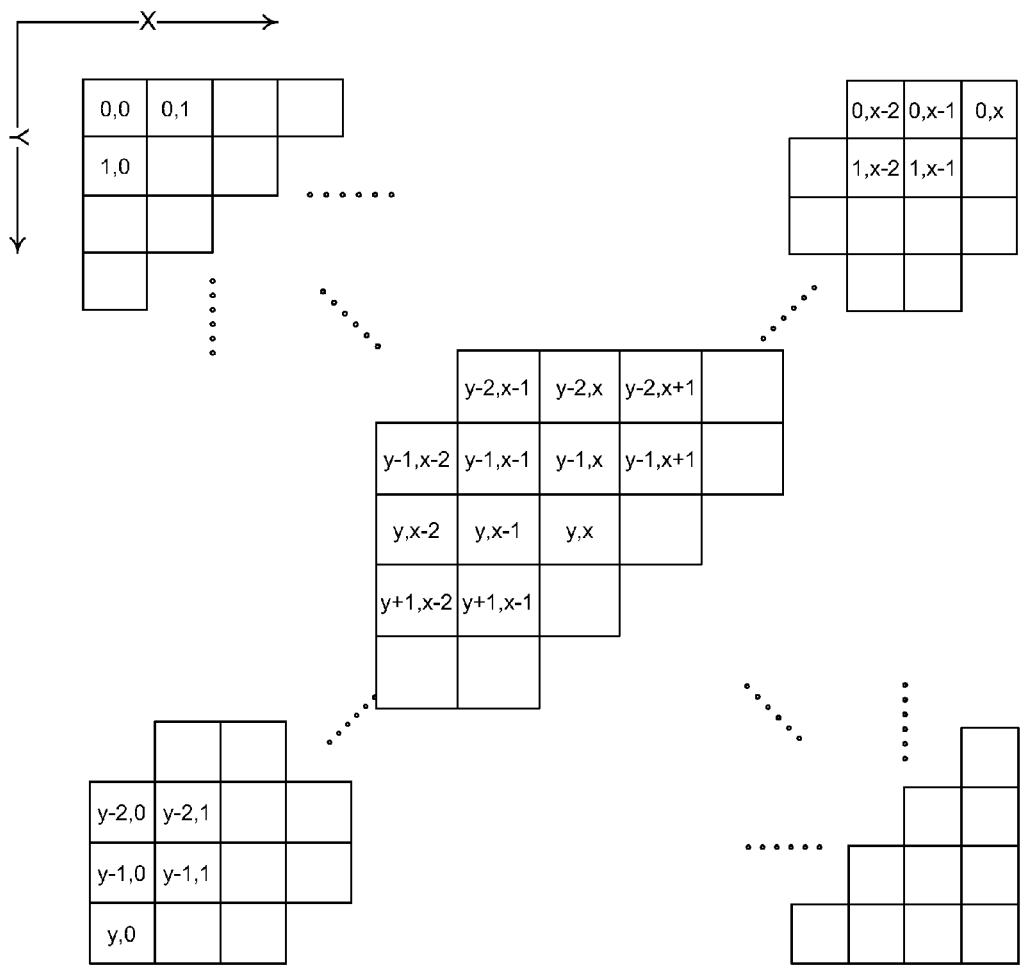
FIG. 3 is a model illustrating adaptive context model selection by zigzag scan in significance map coding and decoding, according to an example.

According to an example, in adaptive context selection with zigzag scan a zigzag scan 200 is used for the significance map coding and decoding for all array sizes. A context model for an element in a significance map is determined based upon the values (0 or 1) of the element's coded neighbors. As one example of adaptive context model determination, given a significance map, the context model for an element in the significance map may be determined as shown in FIG. 3, demonstrating adaptive context model criteria 300 for determining a context model for coding and decoding which includes processing a transform unit. The processing may include generating a significance map having an array which corresponds with an array of the transform unit, such as a significance map array of greater than 8×8 entries. The significance map array may include significance map elements assigned as entries to y-x locations of the significance map array, based on residual measures associated with coding units based on a source picture. For a significance map elements at position (0, 0), (0, 1) or (1, 0), in an array as shown in FIG. 3, a unique context model may be assigned.

For a significance map element at position (0, x>1), in an array as shown in FIG. 3, the context model may be selected based on the values (0 or 1) of the element's neighbors at positions (0, x−1), (0, x−2), (1, x−2), and (1, x−1) if x is an even number.

For a significance map element at position (y>1, 0), in an array as shown in FIG. 3, the context model may be selected based on the values (0 or 1) of the element's neighbors at positions (y−1, 0), (y−2, 0), (y−2, 1) and (y−1, 1) if y is an odd number.

For a significance map element at position (y>0, x>0), in an array as shown in FIG. 3, the context model may be selected based on the value (0 or 1) of the element's neighbors at positions (y−1, x−1), (y−1, x), (y, x−1), and (y−1, x−2) and (y, x−2) if x is larger than 1, (y−1, x−2) if x is larger than 1 and y is smaller than the height−1, (y−2, x−1) and (y−2, x) if y is larger than 1, (y−2, x+1) if y is larger than 1 and x is smaller than the width−1, (y−1, x+1) if the sum of x and y is an odd number and x is smaller than the width−1, (y+1, x−1) if the sum of x and y is an even number and y is smaller than the height−1.

For significance maps based on transform units having a transform array of less than or equal to 8×8 entries, a fixed criteria model may be applied based on a location in the array of the significance map. FIGS. 4A through 4C show context models for 2×2, 4×4 and 8×8 significance map arrays. They are position dependent and designed based upon the assumption that for arrays of the same size, the value (0 or 1) at a specific position in the significance map may follow a similar statistical model. The context selection scheme depicted in FIG. 4A, FIG. 4B and FIG. 4C utilizes the array position as the context selection criteria. However, for larger array sizes, the increased array positions may substantially increase the number of possible context selections which indicates more memory is needed.

Applying the adaptive context model selection by zigzag scan may be utilized to keep the number of context selections for arrays larger than 8×8 within a practical limit.

As a comparative example, in TMuC0.7, one model for HEVC under consideration enables a set of transform coefficient coding and decoding tools. It is switched on by default when the entropy coding option is CABAC/PIPE. Among these tools, an adaptive split zigzag scan 250, as shown in FIG. 2B, is applied for significance map coding and decoding. The experimental results indicate that this adaptive split zigzag scan 250 scheme achieves only negligible performance gain. But, it also introduces additional memory and computational complexity as comparing to the zigzag scan as shown in FIG. 2A.

In TMuC0.7, by default, the entropy coding is set to use the option of CABAC/PIPE which incorporates a set of transform coefficient coding and decoding tools. The set of coding and decoding tools in other HEVC models, includes an adaptive scan scheme which adaptively switches between two scan patterns for the significance map coding and decoding if the transform size is larger than 8×8. In TMuC0.7, the scan order for coding and decoding the significance map is allowed to switch between two predefined scan patterns per diagonal line, that is, either from bottom-left to top-right or from top-right to bottom-left diagonally. The switching occurs at the end of each diagonal sub-scan, and it is controlled by two counters, $c_1$, the number of coded significant transform coefficients that are located in the bottom-left half of the transform block, and $c_2$, the number of coded significant transform coefficients that are located in the top-right half of the transform block.

FIG. 2B shows a comparative example of the adaptive scan for 16×16 blocks, where the diagonal scan can go either way. In the current implementation of significance map coding and decoding of TMuC0.7, this adaptive scan requires additional memories for the two scan patterns as comparing to one zigzag scan pattern and the two counters $c_1$ and $c_2$. It also introduces additional computational complexity due to counting the number coded of significant transform coefficients located in the bottom-left half or in the top-right half, branch operations and scan selection for each coefficient before the last significant coefficient. The context model for an element in significant map is selected based on the coded neighboring elements in the significant map. Since a diagonal scan may go either way, it is necessary to check if the top-right element or bottom-left element is available for a given current element in significant map coding and decoding. This causes additional branch operations. The experimental results indicate that this adaptive scan scheme achieves only negligible performance gain, but at the expense of additional memory requirements and increased computational complexity.

In an example according to the principles of the invention, a zigzag scan 200, which is a zigzag scan, is used for significance map coding and decoding when CABAC/PIPE is selected. TMuC0.7 may be modified to replace the adaptive scan with the zigzag scan 200 for larger transform units (i.e., transform units having an array larger than 8×8). As an example, FIG. 2A shows the zigzag scan for a 16×16 array. Since the scan pattern is fixed, the neighborhood for the context selection is also fixed. Additional memory requirements and computation complexity associated with the adaptive scan in TMuC0.7 no longer exists and an adaptive context selection may be utilized, such as adaptive context criteria 300 shown in FIG. 3, and described above.

The utilization of the adaptive context model selection with zigzag scan improves coding efficiency as inefficiencies in transform processing are reduced. These include inefficiencies based on overhead otherwise associated with computational complexities including tracking the count of coded significant transform coefficients located in the bottom-left half or in the top-right half of a transform, performing branch operations and making scan selections for coefficients in significance map coding and decoding.

Referring again to FIG. 1, the coding system 110 includes an input interface 130, a controller 111, a counter 112, a frame memory 113, an encoding unit 114, a transmitter buffer 115 and an output interface 135. The decoding system 140 includes a receiver buffer 150, a decoding unit 151, a frame memory 152 and a controller 153. The coding system 110 and the decoding system 140 are coupled to each other via a transmission path including a compressed bitstream 105. The controller 111 of the coding system 110 controls the amount of data to be transmitted on the basis of the capacity of the receiver buffer 150 and may include other parameters such as the amount of data per a unit of time. The controller 111 controls the encoding unit 114, to prevent the occurrence of a failure of a received signal decoding operation of the decoding system 140. The controller 111 may be a processor or include, for example, a microcomputer having a processor, a random access memory and a read only memory.

Source pictures 120 supplied from, for example, a content provider may include a video sequence of frames including source pictures in the video sequence. The source pictures 120 may be uncompressed or compressed. If the source pictures 120 is uncompressed, the coding system 110 may be associated with an encoding function. If the source pictures 120 is compressed, the coding system 110 may be associated with a transcoding function. Coding units may be derived from the source pictures utilizing the controller 111. The frame memory 113 may have a first area which may used for storing the incoming source pictures from the source pictures 120 and a second area may be used for reading out the source pictures and outputting them to the encoding unit 114. The controller 111 may output an area switching control signal 123 to the frame memory 113. The area switching control signal 123 may indicate whether the first area or the second area is to be utilized.

The controller 111 outputs an encoding control signal 124 to the encoding unit 114. The encoding control signal 124 causes the encoding unit 114 to start an encoding operation such as preparing the coding units based on a source picture. In response to the encoding control signal 124 from the controller 111, the encoding unit 114 starts to read out the prepared coding units to a high-efficiency encoding process, such as a prediction coding process or a transform coding process which process the prepared coding units generating video compression data based on the source pictures associated with the coding units.

The encoding unit 114 may package the generated video compression data in a packetized elementary stream (PES) including video packets. The encoding unit 114 may map the video packets into an encoded video signal 122 using control information and a program time stamp (PTS) and the encoded video signal 122 may be signaled to the transmitter buffer 115.

The encoded video signal 122 including the generated video compression data may be stored in the transmitter buffer 114. The information amount counter 112 is incremented to indicate the total amount of data in the transmitted buffer 115. As data is retrieved and removed from the buffer, the counter 112 may be decremented to reflect the amount of data in the transmitter buffer 114. The occupied area information signal 126 may be transmitted to the counter 112 to indicate whether data from the encoding unit 114 has been added or removed from the transmitted buffer 115 so the counter 112 may be incremented or decremented. The controller 111 may control the production of video packets produced by the encoding unit 114 on the basis of the occupied area information 126 which may be communicated in order to prevent an overflow or underflow from taking place in the transmitter buffer 115.

The information amount counter 112 may be reset in response to a preset signal 128 generated and output by the controller 111. After the information counter 112 is reset, it may count data output by the encoding unit 114 and obtain the amount of video compression data and/or video packets which has been generated. Then, the information amount counter 112 may supply the controller 111 with an information amount signal 129 representative of the obtained amount of information. The controller 111 may control the encoding unit 114 so that there is no overflow at the transmitter buffer 115.

The decoding system 140 includes an input interface 170, a receiver buffer 150, a controller 153, a frame memory 152, a decoding unit 151 and an output interface 175. The receiver buffer 150 of the decoding system 140 may temporarily store the compressed bitstream 105 including the received video compression data and video packets based on the source pictures from the source pictures 120. The decoding system 140 may read the control information and presentation time stamp information associated with video packets in the received data and output a frame number signal 163 which is applied to the controller 153. The controller 153 may supervise the counted number of frames at a predetermined interval, for instance, each time the decoding unit 151 completes a decoding operation.

When the frame number signal 163 indicates the receiver buffer 150 is at a predetermined capacity, the controller 153 may output a decoding start signal 164 to the decoding unit 151. When the frame number signal 163 indicates the receiver buffer 150 is at less than a predetermined capacity, the controller 153 may wait for the occurrence of a situation in which the counted number of frames becomes equal to the predetermined amount. When the frame number signal 163 indicates the receiver buffer 150 is at the predetermined capacity, the controller 153 may output the decoding start signal 164. The encoded video packets and video compression data may be decoded in a monotonic order (i.e., increasing or decreasing) based on presentation time stamps associated with the encoded video packets.

In response to the decoding start signal 164, the decoding unit 151 may decode data amounting to one picture associated with a frame and compressed video data associated with the picture associated with video packets from the receiver buffer 150. The decoding unit 151 may write a decoded video signal 162 into the frame memory 152. The frame memory 152 may have a first area into which the decoded video signal is written, and a second area used for reading out decoded pictures 160 to the output interface 175.

According to different examples, the coding system 110 may be incorporated or otherwise associated with a transcoder or an encoding apparatus at a headend and the decoding system 140 may be incorporated or otherwise associated with a downstream device, such as a mobile device, a set top box or a transcoder. These may be utilized separately or together in methods of coding and/or decoding utilizing adaptive context model selection with zigzag scan in processing transform units. Various manners in which the coding system 110 and the decoding system 140 may be implemented are described in greater detail below with respect to FIGS. 5, 6 and 7, which depict flow diagrams of methods 500, 600 and 700.

Method 500 is a method for preparing a coded significance map utilizing adaptive context model selection with zigzag scan. Method 600 is a method for coding utilizing coding units and coded significance maps prepared utilizing transform units processed using adaptive context model selection with zigzag scan. Method 700 is a method for decoding utilizing compression data generated utilizing coding units and coded significance maps prepared utilizing transform units processed using adaptive context model selection with zigzag scan. It is apparent to those of ordinary skill in the art that the methods 500, 600 and 700 represent generalized illustrations and that other steps may be added and existing steps may be removed, modified or rearranged without departing from the scope of the methods 500, 600 and 700. The descriptions of the methods 500, 600 and 700 are made with particular reference to the coding system 110 and the decoding system 140 depicted in FIG. 1. It should, however, be understood that the methods 500, 600 and 700 may be implemented in systems and/or devices which differ from the coding system 110 and the decoding system 140 without departing from the scope of the methods 500, 600 and 700.

Figure 5:
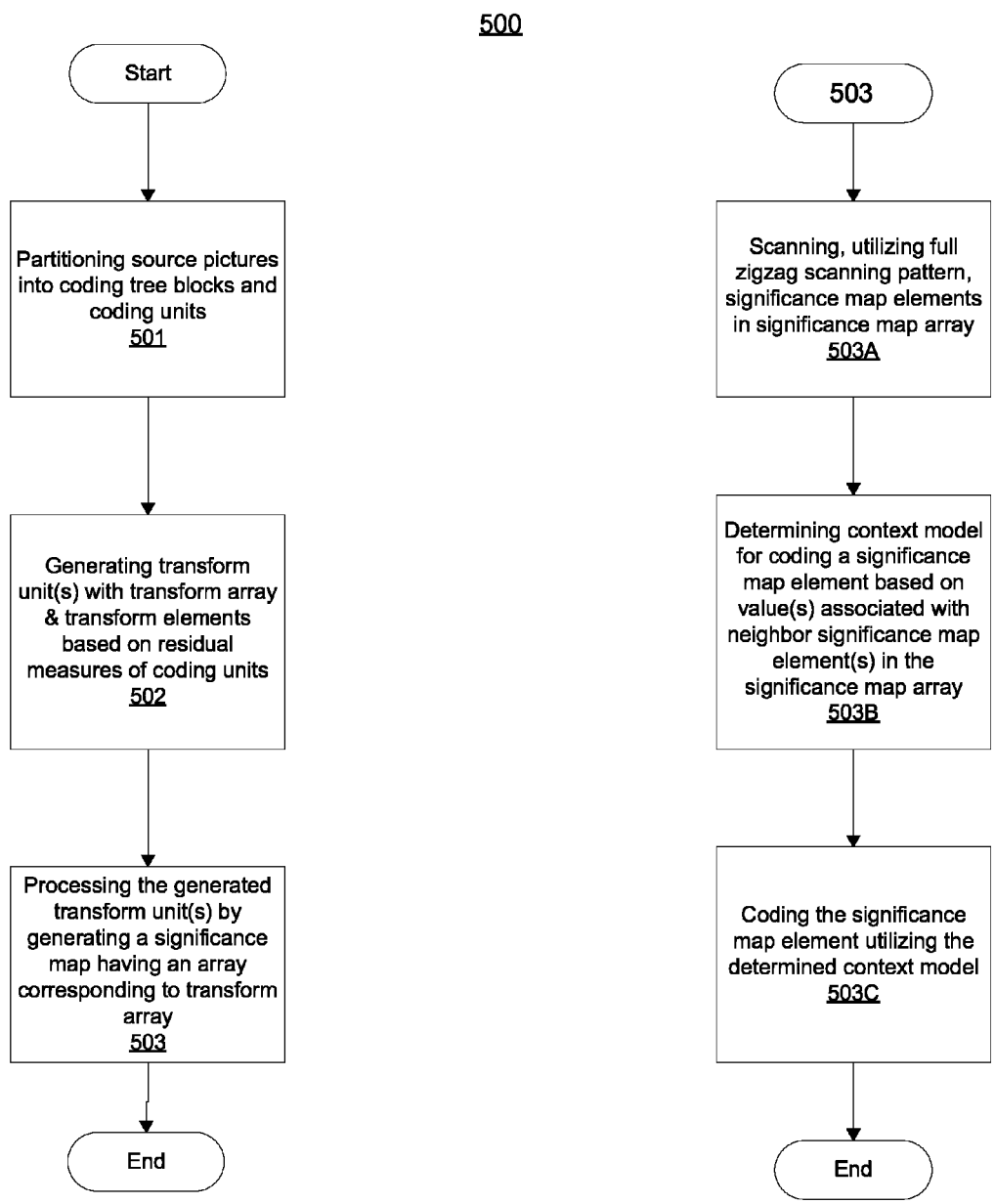
FIG. 5 is a flow diagram illustrating a method for preparing a coded significance map utilizing adaptive context model selection with zigzag scan, according to an example.

With reference to the method 500 in FIG. 5, at step 501, the controller 111 associated with the coding system 110 partitions the source pictures into coding units, such by a quad tree format.

At step 502, the controller 111, generates transform units, including at least one transform unit having a transform array, including transform elements assigned as entries to y-x locations of the transform array, based on residual measures associated with the coding units. The transform units may be generated following a prediction process also used in generating the video compression data.

At step 503, the controller 111 processes the generated transform units by generating a significance map having a significance map array with y-x locations corresponding to the y-x locations in the transform array. Step 503 may be subdivided into steps 503A-503B as shown below.

At step 503A, the controller 111 and the encoding unit 114 scan, utilizing a zigzag scanning pattern, a plurality of significance map elements in the significance map array.

At step 503B, the controller 111 determines a context model for coding a significance map element of the plurality of significance map elements based on a value associated with at least one neighbor significance map element of the significance map element in the significance map.

At step 503C, the controller 111 and the encoding unit 114 code the significance map element utilizing the determined context model to form a coded significance map element of the significance map. This coding process may be an entropy coding process to reduce the y-x array of the significance map to a simpler matrix.

Figure 6:
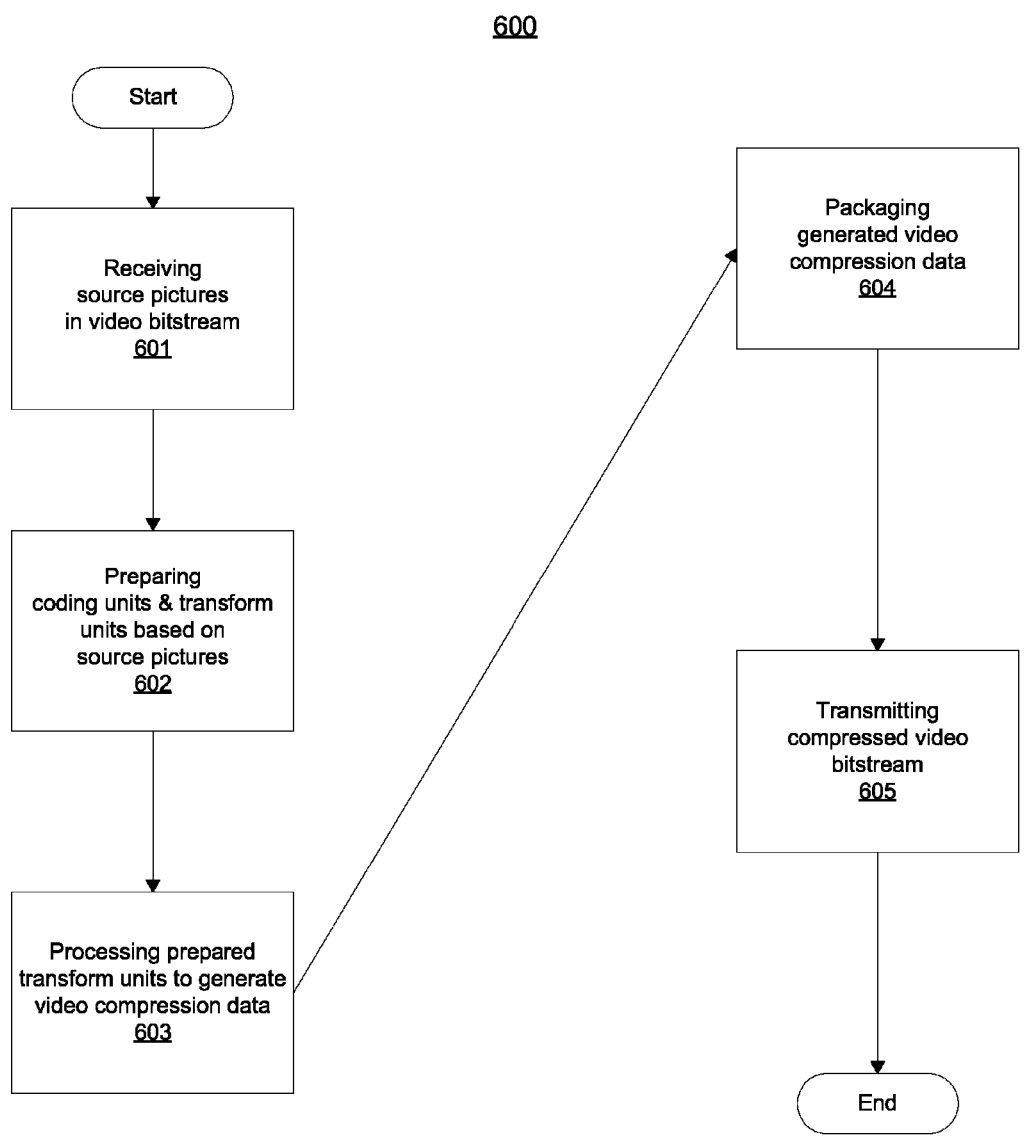
FIG. 6 is a flow diagram illustrating a method for coding utilizing adaptive context model selection with zigzag scan, according to an example.

With reference to the method 600 in FIG. 6, at step 601, the interface 130 and the frame memory 113 of the coding system 110 receive the source pictures 120 including source pictures.

At step 602, the controller 111 prepares coding units and transform units including transform units based on the source pictures. The preparing may be performed as described above with respect to method 500.

At step 603, the controller 111 and the encoding unit 114 process the prepared transform units generating video compression data based on the coding units.

At step 604, the controller 111 and the encoding unit 114 package the generated video compression data.

At step 605, the controller 111 and the transmitter buffer 115 transmit the packaged video compression data in compressed bitstream 105 via the interface 135.

Figure 7:
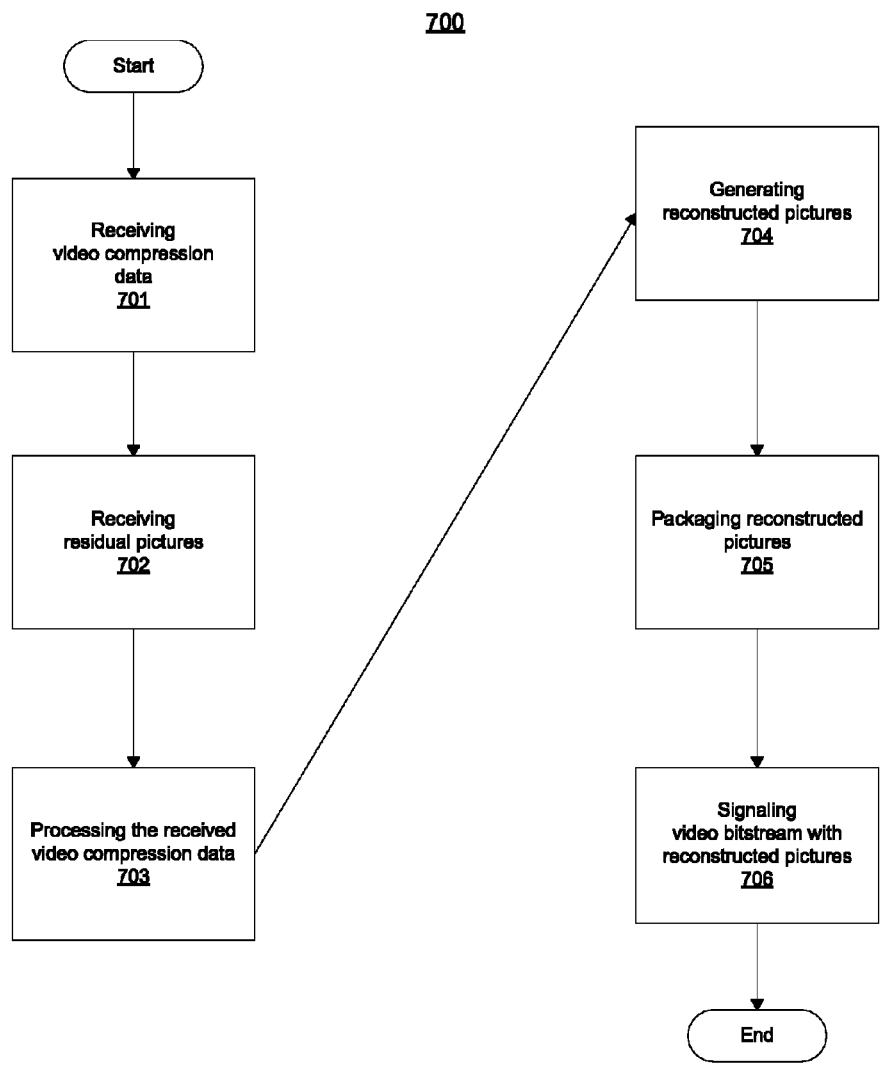
FIG. 7 is a flow diagram illustrating a method for decoding utilizing adaptive context model selection with zigzag scan, according to an example.

With reference to the method 700 in FIG. 7, at step 701, the decoding system 140 receives the compressed bitstream 105 including the video compression data via the interface 170 and the receiver buffer 150.

At step 702, the decoding system 140 receives residual pictures associated with the video compression data via the interface 170 and the receiver buffer 150.

At step 703, the decoding unit 151 and the controller 153 process the received video compression data.

At step 704, the decoding unit 151 and the controller 153 generate reconstructed pictures based on the processed video compression data and the received residual pictures.

At step 705, the decoding unit 151 and the controller 153 package the generated reconstructed pictures and signal them to the frame memory 152.

At step 706, the controller 153 signals the generated reconstructed pictures in the decoded signal 180 via the interface 175.

Some or all of the methods and operations described above may be provided as machine readable instructions, such as a utility, a computer program, etc., stored on a computer readable storage medium, which may be non-transitory such as hardware storage devices or other types of storage devices. For example, they may exist as program(s) comprised of program instructions in source code, object code, executable code or other formats.

An example of a computer readable storage media includes a conventional computer system RAM, ROM, EPROM, EEPROM, and magnetic or optical disks or tapes. Concrete examples of the foregoing include distribution of the programs on a CD ROM. It is therefore to be understood that any electronic device capable of executing the above-described functions may perform those functions enumerated above.

Figure 8:
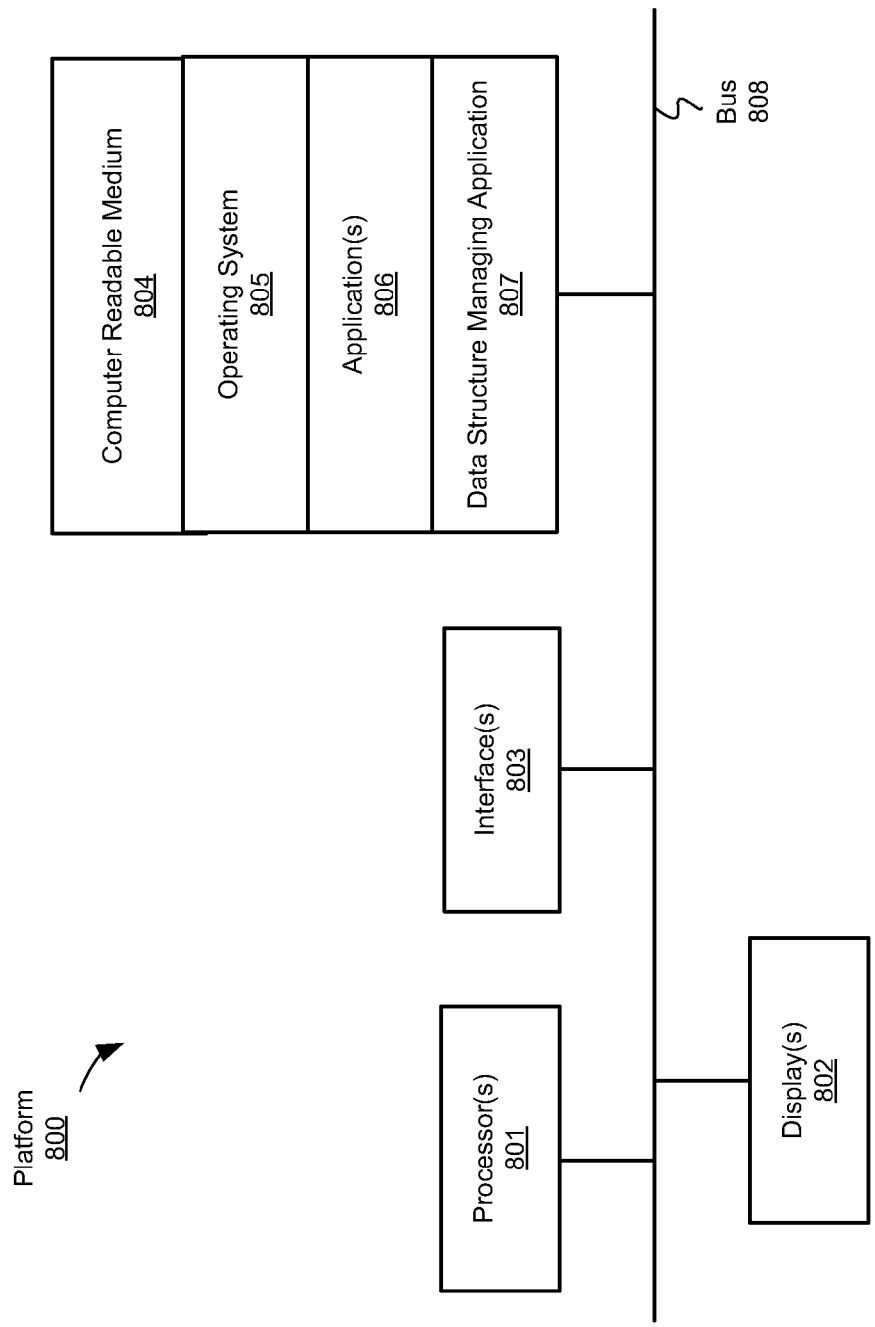
FIG. 8 is a block diagram illustrating a computer system to provide a platform for a system for coding and/or a system for decoding utilizing adaptive context model selection with zigzag scan, according to examples.

Referring to FIG. 8, there is shown a platform 800, which may be employed as a computing device in a system for coding or decoding utilizing adaptive context model selection with zigzag scan, such as coding system 100 and/or decoding system 200. The platform 800 may also be used for an upstream encoding apparatus, a transcoder, or a downstream device such as a set top box, a handset, a mobile phone or other mobile device, a transcoder and other devices and apparatuses which may utilize adaptive context model selection with zigzag scan and associated coding units and transform units processed using adaptive context model selection with zigzag scan. It is understood that the illustration of the platform 800 is a generalized illustration and that the platform 800 may include additional components and that some of the components described may be removed and/or modified without departing from a scope of the platform 800.

The platform 800 includes processor(s) 801, such as a central processing unit; a display 802, such as a monitor; an interface 803, such as a simple input interface and/or a network interface to a Local Area Network (LAN), a wireless 802.11x LAN, a 3G or 4G mobile WAN or a WiMax WAN; and a computer-readable medium 804. Each of these components may be operatively coupled to a bus 808. For example, the bus 808 may be an EISA, a PCI, a USB, a FireWire, a NuBus, or a PDS.

A computer readable medium (CRM), such as CRM 804 may be any suitable medium which participates in providing instructions to the processor(s) 801 for execution. For example, the CRM 804 may be non-volatile media, such as an optical or a magnetic disk; volatile media, such as memory; and transmission media, such as coaxial cables, copper wire, and fiber optics. Transmission media can also take the form of acoustic, light, or radio frequency waves. The CRM 804 may also store other instructions or instruction sets, including word processors, browsers, email, instant messaging, media players, and telephony code.

The CRM 804 may also store an operating system 805, such as MAC OS, MS WINDOWS, UNIX, or LINUX; applications 806, network applications, word processors, spreadsheet applications, browsers, email, instant messaging, media players such as games or mobile applications (e.g., "apps"); and a data structure managing application 807. The operating system 805 may be multi-user, multiprocessing, multitasking, multithreading, real-time and the like. The operating system 805 may also perform basic tasks such as recognizing input from the interface 803, including from input devices, such as a keyboard or a keypad; sending output to the display 802 and keeping track of files and directories on CRM 804; controlling peripheral devices, such as disk drives, printers, image capture devices; and managing traffic on the bus 808. The applications 806 may include various components for establishing and maintaining network connections, such as code or instructions for implementing communication protocols including TCP/IP, HTTP, Ethernet, USB, and FireWire.

A data structure managing application, such as data structure managing application 807 provides various code components for building/updating a computer readable system (CRS) architecture, for a non-volatile memory, as described above. In certain examples, some or all of the processes performed by the data structure managing application 807 may be integrated into the operating system 805. In certain examples, the processes may be at least partially implemented in digital electronic circuitry, in computer hardware, firmware, code, instruction sets, or any combination thereof.

According to principles of the invention, there are systems, methods, and computer readable mediums (CRMs) which provide for coding and decoding utilizing adaptive context model selection with zigzag scan. By utilizing adaptive context model selection with zigzag scan, inefficiencies in transform processing are reduced. These include inefficiencies based on overhead otherwise associated with computational complexities including tracking the count of coded significant transform coefficients located in the bottom-left half or in the top-right half of a transform, performing branch operations and making scan selections for coefficients in significance map coding and decoding.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A system for coding, the system comprising:
a processor configured to prepare video compression data based on source pictures, the preparing including:
partitioning the source pictures into coding units;
generating transform units, each transform unit being a transform array including transform coefficients assigned as entries to y-x locations of the transform array, based on residual measures associated with the coding units; and
for each generated transform unit, processing the generated transform unit by:
generating a significance map, having a significance map array with y-x locations corresponding to the y-x locations of the transform array of the generated transform unit;
when the transform array is above a defined size:
scanning, utilizing a zigzag scanning pattern, a plurality of significance map elements in the significance map array; and
determining a context model for coding a value associated with each of the plurality of significance map elements based on a respective value of at least one neighbor significance map element of the significance map element in the significance map array, the at least one neighbor significance map element located before a position of a current significance map element within a path defined by the zigzag scanning pattern; and
when the transform array is at or below the defined size:
determining the context model for coding the value associated with each of the plurality of significance map elements using a fixed criteria model for each position in the significance map array without reference to other significance map elements in the significance map array.

2. The system of claim 1, wherein, when the transform array is above the defined size, the context model for coding the value associated with each significance map element having a y-x location of one of (0, 0), (0, 1) and (1, 0) in the significance map array is a unique context model.

3. The system of claim 1, wherein, when the transform array is above the defined size, the context model for coding the value associated with each significance map element having a y-x location of (0, x) where x>1 in the significance map array is by the respective value of the significance map element having a y-x location in the significance map array of (0, x−1), (0,x−2), (1, x−2) and, if x is an even number, (1, x−1).

4. The system of claim 1, wherein, when the transform array is above the defined size, the context model for coding the value associated with each significance map element having a y-x location of (y, 0) where y>1 in the significance map array is determined by the respective value of the significance map element having a y-x location in the significance map array of (y−1, 0), (y−2, 0), (y−2, 1) and, if y is an odd number, (y−1, 1).

5. The system of claim 1, wherein the processing of the generated transform unit includes coding the value associated with each significance map element utilizing the determined context model.

6. The system of claim 1, wherein residual measures associated with the coding units are generated based on a prediction process performed on prediction units based on the coding units.

7. The system of claim 1, wherein each transform array has a size of one of 8×8, 16×16, 32×32, 64×64, 128×128 and 256×256; and wherein the processor is configured to determine the defined size to be a transform array of 8×8.

8. A method for coding, the method comprising preparing video compression data based on source pictures utilizing a processor, the preparing including:
partitioning the source pictures into coding units;
generating a plurality of transform units, each transform unit being a transform array including transform coefficients assigned as entries to y-x locations of the transform array, based on residual measures associated with the coding units; and
for each generated transform unit, processing the generated transform unit by:
generating a significance map, having a significance map array with y-x locations corresponding to the y-x locations of the transform array of the generated transform unit;
when the transform array is above a defined size:
scanning, utilizing a zigzag scanning pattern, a plurality of significance map elements in the significance map array; and determining a context model for coding a value associated with each of the plurality of significance map elements based on a respective value of at least one neighbor significance map element of the significance map element in the significance map array, the at least one neighbor significance map element located before a position of a current significance map element within a path defined by the zigzag scanning pattern; and when the transform array is at or below the defined size:
determining the context model for coding the value associated with each of the plurality of significance map elements using a fixed criteria model for each position in the significance map array without reference to other significance map elements in the significance map array.

9. The method of claim 8, wherein, when the transform array is above the defined size:
the context model for coding the value associated with each significance map element having a y-x location of one of (0, 0), (0, 1) and (1, 0) in the significance map array is a unique context model;
the context model for coding the value associated with each significance map element having a y-x location of (0, x) where x>1 in the significance map array is determined by the respective value of the significance map element having a y-x location in the significance map array of (0, x−1), (0,x−2), (1, x−2) and, if x is an even number, (1, x−1); and
the context model for coding the value associated with each significance map element having a y-x location of (y, 0) where y>1 in the significance map array is determined by the respective value of the significance map element having a y-x location in the significance map array of (y−1, 0), (y−2, 0), (y−2, 1) and, if y is an odd number, (y−1, 1).

10. A non-transitory computer readable medium storing computer readable instructions that when executed by a computer system perform a method for coding, the method comprising:
preparing video compression data based on source pictures utilizing a processor, the preparing including:
partitioning the source pictures into coding units;
generating a plurality of transform units, each transform unit being a transform array including transform coefficients assigned as entries to y-x locations of the transform array, based on residual measures associated with the coding units; and
for each generated transform unit, processing the generated transform unit by:
generating a significance map, having a significance map array with y-x locations corresponding to the y-x locations of the transform array of the generated transform unit;
when the transform array is above a defined size:
scanning, utilizing a zigzag scanning pattern, a plurality of significance map elements in the significance map array; and
determining a context model for coding a value associated with each of the plurality of significance map elements based on a respective value of at least one neighbor significance map element of the significance map element in the significance map array, the at least one neighbor significance map element located before a position of a current significance map element within a path defined by the zigzag scanning pattern; and when the transform array is at or below the defined size:
determining the context model for coding the value associated with each of the plurality of significance map elements using a fixed criteria model for each position in the significance map array without reference to other significance map elements in the significance map array.

11. The non-transitory computer readable medium of claim 10, wherein, when the transform array is above the defined size:
the context model for coding the value associated with each significance map element having a y-x location of one of (0, 0), (0, 1) and (1, 0) in the significance map array is a unique context model;
the context model for coding the value associated with each significance map element having a y-x location of (0, x) where x>1 in the significance map array is determined by the respective value of the significance map element having a y-x location in the significance map array of (0, x−1), (0,x−2), (1, x−2) and, if x is an even number, (1, x−1); and
the context model for coding the value associated with each significance map element having a y-x location of (y, 0) where y>1 in the significance map array is determined by the respective value of the significance map element having a y-x location in the significance map array of (y−1, 0), (y−2, 0), (y−2, 1) and, if y is an odd number, (y−1, 1).

12. A system for decoding, the system comprising:
an interface configured to receive video compression data; and
a processor configured to process the received video compression data, wherein the received video compression data is based on processed transform units, based on source pictures, and the processed transform units are prepared by steps including
partitioning the source pictures into coding units;
generating a plurality of transform units, each transform unit being a transform array including transform coefficients assigned as entries to y-x locations of the transform array, based on residual measures associated with the coding units; and
for each generated transform unit, processing the generated transform unit by:
generating a significance map, having a significance map array with y-x locations corresponding to the y-x locations of the transform array of the generated transform unit;
when the transform array is above a defined size:
scanning, utilizing a zigzag scanning pattern, a plurality of significance map elements in the significance map array; and
determining a context model for coding a value associated with each of the plurality of significance map elements based on a respective value of at least one neighbor significance map element of the significance map element in the significance map array, the at least one neighbor significance map element located before a position of a current significance map element within a path defined by the zigzag scanning pattern; and when the transform array is at or below the defined size:
determining the context model for coding the value associated with each of the plurality of significance map elements using a fixed criteria model for each position in the significance map array without reference to other significance map elements in the significance map array.

13. The system of claim 12, wherein, when the transform array is above the defined size, the context model for coding the value associated with each significance map element having a y-x location of one of (0, 0), (0, 1) and (1, 0) in the significance map array is a unique context model.

14. The system of claim 12, wherein, when the transform array is above the defined size, the context model for coding the value associated with each significance map element having a y-x location of (0, x) where x>1 in the significance map array is determined by the respective value of the significance map element having a y-x location in the significance map array of (0, x−1), (0,x−2), (1, x−2) and, if x is an even number, (1, x−1).

15. The system of claim 12, wherein, when the transform array is above the defined size, the context model for coding the value associated with each significance map element having a y-x location of (y, 0) where y>1 in the significance map array is determined by the respective value of the significance map element having a y-x location in the significance map array of (y−1, 0), (y−2, 0), (y−2, 1) and, if y is an odd number, (y−1, 1).

16. The system of claim 12, wherein the processing of the generated transform unit includes coding the value associated with each significance map element utilizing the determined context model.

17. The system of claim 12, wherein residual measures associated with coding units are generated based on a prediction process performed on prediction units based on the coding units.

18. The system of claim 12, wherein each transform array has a size of one of 8×8, 16×16, 32×32, 64×64, 128×128 and 256×256.

19. A method for decoding, the method comprising:
receiving video compression data; and
processing the received video compression data, utilizing a processor, wherein the received video compression data is based on processed transform units, based on source pictures, and the processed transform units are prepared by steps including:
partitioning the source pictures into coding units;
generating a plurality of transform units, each transform unit being a transform array including transform coefficients assigned as entries to y-x locations of the transform array, based on residual measures associated with the coding units; and
for each generated transform unit, processing the generated transform unit by:
generating a significance map, having a significance map array with y-x locations corresponding to the y-x locations of the transform array of the generated transform unit;
when the transform array is above a defined size:
scanning, utilizing a zigzag scanning pattern, a plurality of significance map elements in the significance map array; and
determining a context model for coding a value associated with each of the plurality of significance map elements based on a respective value of at least one neighbor significance map element of the significance map element in the significance map array, the at least one neighbor significance map element located before a position of a current significance map element within a path defined by the zigzag scanning pattern; and
when the transform array is at or below the defined size:
determining the context model for coding the value associated with each of the plurality of significance map elements using a fixed criteria model for each position in the significance map array without reference to other significance map elements in the significance map array.

20. A non-transitory computer readable medium storing computer readable instructions that when executed by a computer system perform a method for decoding, the method comprising:
receiving video compression data; and
processing the received video compression data, utilizing a processor, wherein the received video compression data is based on processed transform units, based on source pictures, and the processed transform units are prepared by steps including:
partitioning the source pictures into coding units;
generating a plurality of transform units, each transform unit being a transform array including transform coefficients assigned as entries to y-x locations of the transform array, based on residual measures associated with the coding units; and
for each generated transform unit, processing the generated transform unit by:
generating a significance map, having a significance map array with y-x locations corresponding to the y-x locations of the transform array of the generated transform unit;
when the transform array is above a defined defined size:
scanning, utilizing a zigzag scanning pattern, a plurality of significance map elements in the significance map array; and
determining a context model for coding a value associated with each of the plurality of significance map elements based on a respective value of at least one neighbor significance map element of the significance map element in the significance map array, the at least one neighbor significance map element located before a position of a current significance map element within a path defined by the zigzag scanning pattern; and
when the transform array is at or below the defined size:
determining the context model for coding the value associated with each of the plurality of significance map elements using a fixed criteria model for each position in the significance map array without reference to other significance map elements in the significance map array.

* * * * *